United States Patent [19]

Smolker et al.

[11] 3,882,324

[45] May 6, 1975

[54] METHOD AND APPARATUS FOR COMBUSTIBLY DESTROYING MICROELECTRONIC CIRCUIT BOARD INTERCONNECTIONS

[75] Inventors: Gary Smolker, Venice; Leon Chernick, Encino, both of Calif.

[73] Assignee: The United States of America as represented by the Secretary of the Navy, Washington, D.C.

[22] Filed: Dec. 17, 1973

[21] Appl. No.: 425,406

[52] U.S. Cl......... 307/202 A; 317/101 A; 174/68.5; 174/DIG. 3; 149/2; 102/28 R; 109/29

[51] Int. Cl......................... H05k 1/18; C06b 19/00

[58] Field of Search.. 307/202 A; 102/28 R, 70.2 R; 149/2, 37, 109; 317/101 CC, 101 CE, 101 A; 109/29, 36, 37; 174/DIG. 3, 68.5

[56] References Cited

UNITED STATES PATENTS

| | | | |
|---|---|---|---|
| 3,394,218 | 7/1968 | Foudriat | 174/68.5 |
| 3,643,609 | 2/1972 | Maywald et al. | 109/29 |
| 3,666,967 | 5/1972 | Keister et al. | 307/202 A |

*Primary Examiner*—John S. Heyman
*Attorney, Agent, or Firm*—Richard S. Sciascia; Paul N. Critchlow

[57] ABSTRACT

Metallized interconnections conventionally are used to interconnect active and passive components of MOS (metal-oxide semiconductor) circuits and the like. These and other similar metal interconnections can be formed of electrically-conductive, self-destruct aluminum and tungstic oxide films or other similar metal oxide films, which, when ignited, produce a self-destructive, violent, exothermic chemical reaction. Ignition of the self-destruct interconnections is achieved by enclosing the circuit board in a box which also mounts a sheet of pyrofuse foil. The enclosed metallized connections are directly exposed to the foil so that, when the foil is ignited, the high heat of its thermite reaction ignites the self-destruct film interconnections. The violent reaction of the foil also produces a sputtering of high temperature metal particles which strike the metallized interconnections at various points to positively assure ignition and the desired destruction of these interconnections.

6 Claims, 3 Drawing Figures

METHOD AND APPARATUS FOR COMBUSTIBLY DESTROYING MICROELECTRONIC CIRCUIT BOARD INTERCONNECTIONS

BACKGROUND OF THE INVENTION

The present invention relates to self-destruct microelectronic circuit board modules and, particularly, to means for remotely destroying the metallized interconnections of MOS modules.

In critical situations such as the well-known Pueblo incident, there is an urgent need to quickly destroy sensitive or classified circuit information and, usually, the urgency of the situation demands a capacity for achieving the destruction in response to a signal or command initiated at one or more remote locations. Various destruct systems have been devised for this purpose, some of which contemplate the use of chemical, metallurgical, or explosively-actuated mechanisms. However, because of the extreme miniaturization trends in present-day microelectronic techniques, most of these systems or mechanisms cannot be used. Other mechanisms more compatible with present-day microelectronic techniques have been developed but, for the most part these other mechanisms appear to be limited in their design to certain specialized functions such as the destruction of the resistive elements of thin film circuitry or the removal of the dopant of semiconductor circuitry.

One good example of a self-destruct mechanism that is compatible with present-day microelectronics is that disclosed in U.S. Pat. No. 3,666,967 issued May 30, 1972 to inventors, Keister and Smolker. The disclosure of this particular patent subsequently will be discussed in some detail. For the present, it can be noted that it discloses an excellent self-destruct film which also is employed in the present invention. However, the patent disclosure is concerned entirely with thin flim circuitry and consequently its use is limited at least to the extent that its teachings do not extend to the destruction of metallized interconnectors of MOS circuitry or other types of integrated circuits that emply semiconductor circuit elements.

Other recognized difficulties pertaining generally to the destruction of microelectronic circuitry include the problem of assuring a complete destruction as opposed to a partial destruction of the circuitry. For example, a complete destruction involves not only the destruction of the microcircuit operation and design but also the destruction of any information indicative of the technology used to fabricate the microcircuit. Obviously, a partial or incomplete destruction is not acceptable particularly in view of the high-level capability in the art of reconstituting complete concepts based upon only fragmentary information.

Another consideration involving principally the trend toward extremely small microelectronic circuits has been the fact that most prior self-destruct mechanisms required special leads or interconnections to explosively-actuate or ignite the particular device used to accomplish the destruction. Since these leads simply add to the number of conventional leads needed for energizing the circuitry, their use obviously is incompatible with present-day size requirements.

BRIEF SUMMARY OF THE INVENTION

These and other difficulties presently are avoided by forming the metallized interconnections of MOS circuitry or other types of microelectronic circuitry from suerimposed film of electrically-conductive materials adapted when ignited to maintain a self-destructive thermite reaction. A pyrofuse film is disposed in close proximity to the interconnections and the entire arrangement enclosed in a box-like structure so that, ignition of the pyrofuse film generates sufficient heat to ignite the self-destruct interconnections. Ignition of the interconnections as well as their complete destruction further is assured by the fact that hot particles of the combustible pyrofuse contact the interconnections at a number of locations.

A principal object of the invention is to provide a reliable means for accomplishing a complete destruction of the metallized interconnections in response to a command or signal initiated at a remote location.

Another important object is to broaden the scope of microcircuitry available to self destruction as well as to modify self-destruct packaging to the extent that the need for self-destruct leads or connections to the operating circuit is avoided.

A further object is to provide a self-destruct system applicable to a variety of microelectronic circuits including, particularly, MOS type circuits but also including other types of circuits such as the thin-film circuits.

BRIEF DESCRIPTION OF THE DRAWINGS

The present invention is illustrated in the accompanying drawings of which.

DETAILED DESCRIPTION OF THE PRESENT INVENTION

Figure 1:
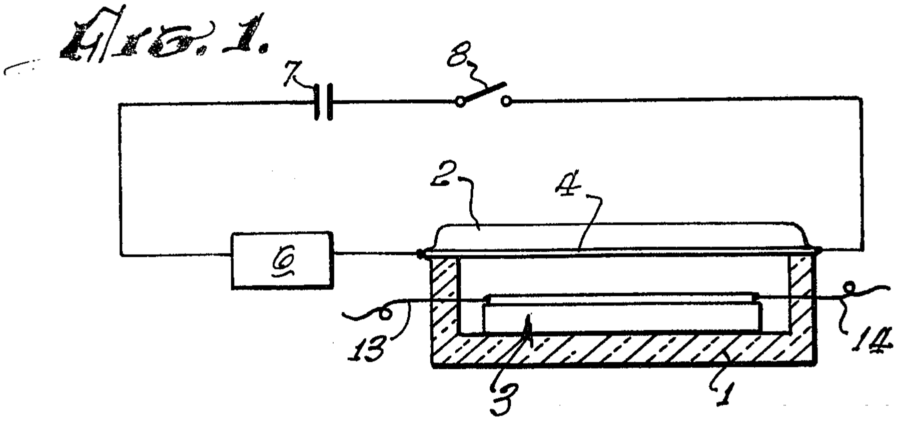
FIG. 1 schematically illustrates one particular manner of packaging a MOS-type circuit to assure complete self-destruction upon command.

The arrangement of FIG. 1 shows a box-like enclosure 1 having a separable lid portion 2, this enclosure being formed of any suitable material. To provide some indication as to size, the enclosure can be considered as a flat 1 by 1 inch package. A MOS microelectronic module 3 is placed in the package along with a sheet 4 of a pyrofuse foil, the MOS module resting on the bottom of the package and the foil being contained between the lid and the side walls of the box-like enclosure. The pyrofuse foil is a commercially available lead-aluminum-lead foil, the lead and aluminum reacting when ignited and burned to form a eutectic alloy. The proportion of the reactants is about 75 percent by weight of lead and 25 percent by weight of aluminum and its auto-ignition temperature is about 1,225°F. Theoretically, 325 calories per gram of heat is given off during the lead plus aluminum eutectic reaction and as has been indicated, the high degree of heat thus made available is sufficient to ignite the metallized interconnections which, as will be described, are formed on the MOS module.

Ignition of sheet 4 of the pyrofuse foil can be accomplished in any described manner although, as has been stated, it is most desirable that the ignition be capable of being accomplished upon the initiation of a command or signal at a remote location. As shown, sheet 4 of the foil is coupled into an electrical circuit including a power source 6, a capacitor 7 and a switch 8. Closing of switch 8 permits the capacitor to discharge through the foil and the resulting heat produces the necessary ignition of the foil. A relatively small amount of energy is needed for this ignition. Of course, other well known arrangements for igniting the widely-used pyrofuse film may be substituted. As also will be appreciated, any thin sheet formed of exothermic reactive materials can be substituted for the so-called pyrofuse, the principal requirement being that the film or sheet be capable of being ignited by the application of energy derived from an external source and of burning at a sufficient high temperature to ignite the metallized interconnections to be destroyed. In other words, the auto-ignition temperature of the foil supplemented by the heat exothermically generated during its combustion must be sufficient to ignite the metallized interconnections. In this regard, it will be apparent that the auto-ignition temperature of the foil should be close to that of the auto-ignition temperature of the metallized interconnections to be destroyed.

Figure 2:
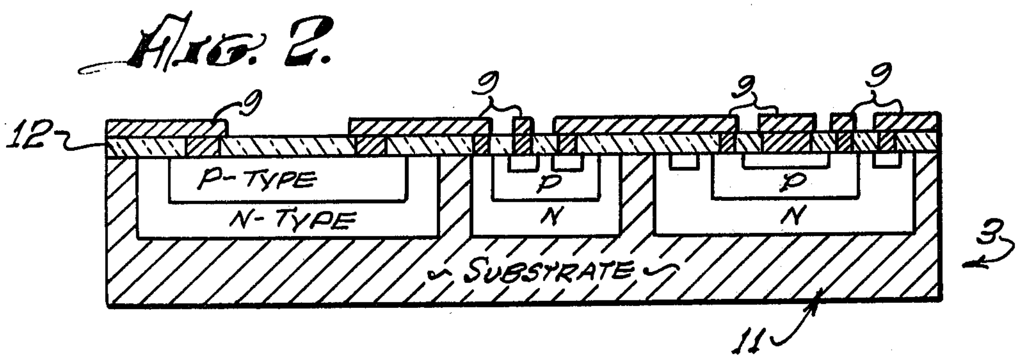
FIG. 2 illustrates for descriptive purposes a particular MOS circuit representative of the MOS circuit of FIG. 1.
Figure 3:
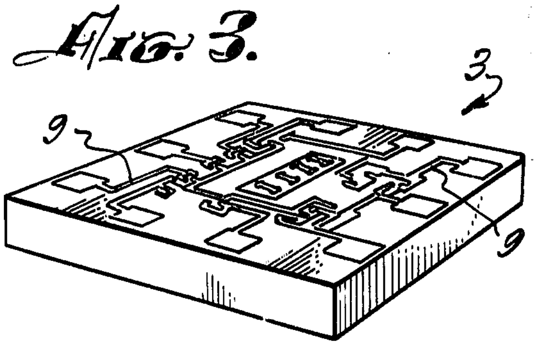
FIG. 3 is a perspective view of the circuit illustrated in FIG. 2.

The MOS component identified by the numeral 3 of FIG. 1 is further illustrated in FIGS. 2 and 3, although, as has been indicated, the circuitry of FIGS. 2 and 3 is provided solely for descriptive purposes and, manifestly, there is no intent to limit the invention to circuits of this particular type. FIGS. 2 and 3 show a special semiconductor circuit which includes certain circuit elements diffused within the semiconductor substrate. However, the present self-destruct arrangement can be applied to a variety of other circuits such, for example, as the resistive elements of thin film circuitry or other metal conductors employed in microelectronic modules.

Referring particularly to FIG. 2, the metallization interconnectors which are to be destroyed are represented by connector elements 9 disposed as shown on the top surface of module 3. Thus, according to conventional practice, a MOS circuit module can be formed by providing a substrate 11 formed of adjacent layers of P-type and N-type semiconductor materials on top of which is an insulating layer 12 such as silicon oxide, aluminum oxide or other appropriate insulating materials. Electrical circuit elements such as transistors, diodes, resistors etc., are formed by diffusion techniques within the substrate. Such techniques include for example, a series of processes each of which involves the steps of masking, etching, and diffusion. Typically, the silicon oxide insulating layer is coated with a material known as photo-resist over which is placed a suitable mask that is opaque in areas where the oxide layer is to be removed. Ultra-violet radiation then can be used to remove the portions of the oxide that are not masked and following this exposure heavy concentrations of P-type or N-type impurities diffused to provide the desired circuit elements. FIGS. 2 and 3 are intended to illustrate the end result of such processing.

To complete the circuit, the semi-conductor elements are coupled by the metallized interconnections previously identified by numeral 9. These interconnections also may be formed by the photo-resist technique which has been described. Thus, as a first step, the insulation layer is etched selectively to expose appropriate portions of each of the circuit components to which the interconnections are to be coupled. Following the etching, a thin coating of the material used for the metallized interconnections is evaporated over the entire surface of the semiconductor wafer. Again, a photoresist-masking sequence is performed followed by a selective etching to produce the desired network of interconnections so as to realize a complete circuit diagram including the diffused components.

One particular feature of the present invention is the fact that metallized interconnections 9 are formed of particular self-destrcut materials which, when ignited, produce an exothermic chemical reaction. In addition to being combustibly self-destructive these metallized interconnections obviously must be electrically conductive.

Preferably, interconnections 9 are formed of the self-destruct film materials disclosed in previously-mentioned U.S. Pat. No. 3,666,967. As may be noted, this patent discloses the use of adjacently-deposited thin films of tungstic oxide and aluminum, the tungstic oxide film being evaporated from a 99.9 percent tungsten oxide powder and the aluminum film deposited from a 99.99 percent pure aluminum wire heated and evaporated for deposition by vacuum on the substrate. For the purposes of the present invention, metallization interconnects 9 are formed by first depositing a metal layer consisting of a 1000 A of aluminum and 1200 A of tungstic oxide. This layer consisting of the two deposited films then is photo etched in the manner already described to provide the illustrated metallization pattern which realizes the complete circuitry of the microelectronic module. Leads, such as wires 13 and 14 shown in FIG. 1 then are coupled to metallization interconnects 9 to provide the power needed for circuit operation.

The completed self-destruct module then is enclosed in box-like enclosure 1 (FIG. 1) along with the previously-described pyrofuse foil that promotes the ignition of the self-destruct interconnects so as to assure their destruction. Upon ignition of the pyrofuse foil which, as stated, has an auto-ignition temperature of 1225°F, the heat given off by the foil plus the hot metal particles provided by the lead and aluminum reaction of the foil is capable of setting off an exothermic aluminum plus tungsten oxide reaction. In this regard, it is to be noted, that the auto-ignition temperature for the aluminum tungstic oxide is 1520°F and the heat of the aluminum plus tungstic oxide reaction is 715 calories per gram. Since the pyrofuse foil and the aluminum-tungstic oxide films react exothermically when raised to their respective ignition temperatures, the interruptions of the electrical energy does not remove all energy sources from the destruct film and the combustion of the film thus can be maintained. Additionally, as indicated, hot metal particles derived from the lead and aluminum reaction of the pyrofuse film directly contact the metallized interconnections of other film combinations such as aluminum and the oxides of iron, magnesium or chromium.

The advantages of the present arrangement should be reasonably apparent from the foregoing description. One significant advantage is that the MOS circuitry, such as is that shown in FIG. 2, does not require the use of special leads or interconnections to accomplish the self-destruction. Instead, the leads are made directly to the pyrofuse foil which is separate from the MOS circuitry. Further, the self-destruct system achieved by forming the metallized interconnections of a self-destruct film material and enclosing the module in an enclosure with a pyrofuse is applicable to any type of circuitry in which the metal of the interconnection is exposed to the heat generated by the burning of the foil. In other words, the self-destruct system is not limited to the MOS circuitry although it is particularly well suited to this type circuitry and it is entirely compatible with MOS technologies. In particular, it will be noted that the destruction of metallized interconnects 9 of these circuits achieves a complete destruction of any useful information such as otherwise might permit a compromise of sensitive or classified technology.

Obviously many modifications and variations of the present invention are possible in the light of the above techings. It is therefore to be understood that within the scope of the appended claims the invention may be practiced otherwise than as specifically described.

We claim:

1. Self-destruct apparatus for combustibly destroying circuit board electrical interconnectors comprising:
- a box-like enclosure,
- a microelectronic circuit board provided on one of its surfaces with electrical circuit interconnectors formed of superimposed films of metallized electrically-conductive exothermically-reactive materials adapted when ignited to self-destructively maintain combustion,
- an ignitable and combustible sheet formed of exothermically reactive materials having an auto-ignition temperature approximating that of said interconnector materials, and
- remotely-controllable means of igniting said sheet,
- said circuit board and said ignitable sheet being disposed in a spaced relationship within said box-like enclosure with said circuit board interconnectors spanned by and directly exposed to said sheet,
- whereby ignition and combustion of said exothermic sheet directly and indirectly applies to said interconnectors a temperature sufficient to produce the auto-ignition and the desired destruction of said interconnectors.

2. The apparatus of claim 1 wherein said interconnectors are formed by adjacently-deposited films of aluminum and tungstic oxide.

3. The apparatus of claim 2 wherein said ignitable sheet is a pyrofuse foil formed lead and aluminum.

4. The apparatus of claim 3 wherein said circuit board includes a metal-oxide semiconductor substrate and said metallized interconnectors are employed to complete an electronic circuit incorporating circuit elements formed in said substrate.

5. The apparatus of claim 4 wherein the aluminum film is about 1000 A, the tungstic oxide film is about 1200 A and the pyrofuse foil is about .0008 inch.

6. A method of combustibly destroying microelectronic circuit board interconnectors comprising:
- forming the interconnectors of superimposed films of metallized electrically-conductive exothermically-reactive materials adapted when ignited to self-destructively maintain combustion, and
- igniting said interconnectors by combustibly disintegrating a pyrofuse-like film in close proximity to the interconnectors,
- the ignition and combustion of said interconnectors being promoted by the heat of combustion of said pyrofuse-like film and by the direct contacts of hot film fragments with the interconnectors.

* * * * *